United States Patent [19]

Reinhardt et al.

[11] Patent Number: 5,021,726

[45] Date of Patent: Jun. 4, 1991

[54] PROCESS FOR DRIVING AN ALTERNATING-CURRENT MOTOR AND AN ALTERNATING CURRENT MOTOR WHICH CAN BE DRIVEN IN ACCORDANCE WITH THIS PROCESS

[75] Inventors: Wilhelm Reinhardt, Schrozberg-Gutbach; Karl-Heinz Schultz, Ohringen-Cappel, both of Fed. Rep. of Germany

[73] Assignee: ebm Elektrobau Mulfingen GmbH & Co., Fed. Rep. of Germany

[21] Appl. No.: 445,986

[22] Filed: Dec. 4, 1989

[30] Foreign Application Priority Data

Dec. 7, 1988 [DE] Fed. Rep. of Germany ....... 3841147

[51] Int. Cl.[5] ............................................. H02P 7/63
[52] U.S. Cl. .................................. 318/811; 318/807; 318/810
[58] Field of Search ............... 318/138, 254, 439, 599, 318/807, 808, 810, 811

[56] References Cited

U.S. PATENT DOCUMENTS

| | | | |
|---|---|---|---|
| 4,233,549 | 11/1980 | Dighe | 388/821 X |
| 4,390,826 | 6/1983 | Erdman et al. | 318/138 X |
| 4,465,961 | 8/1984 | Landino | 318/810 X |
| 4,581,696 | 4/1986 | Gyugyi et al. | 318/810 X |
| 4,689,543 | 8/1987 | Hucker | 318/798 |
| 4,769,581 | 9/1988 | Rilly | 318/254 |
| 4,780,652 | 10/1988 | Rilly | 318/254 |

FOREIGN PATENT DOCUMENTS 0221574 7/1086 European Pat. Off. .
1022199 9/1966 United Kingdom .

Primary Examiner—Bentsu Ro
Attorney, Agent, or Firm—Jones, Askew & Lunsford

[57] ABSTRACT

Method and apparatus for driving an alternating-current motor. A sinusoidal supply AC voltage is rectified into a pulsating, unsmoothed DC voltage, with sinusoidal half waves and from this DC voltage an alternating-current motor voltage is produced by means of controllable polarity reversal. The pulse width of this alternating-voltage of the motor can be modulated. The polarity reversal takes place in accordance with the supply frequency in such a way that the AC voltage of the motor is essentially composed of the sinusoidal half waves of the pulsating DC voltage. For this purpose, the motor speed can be altered by changing the AC voltage of the motor with a constant timing frequency, lying outside the range of audibility, into pulse-width modulatable voltage pulses.

27 Claims, 8 Drawing Sheets

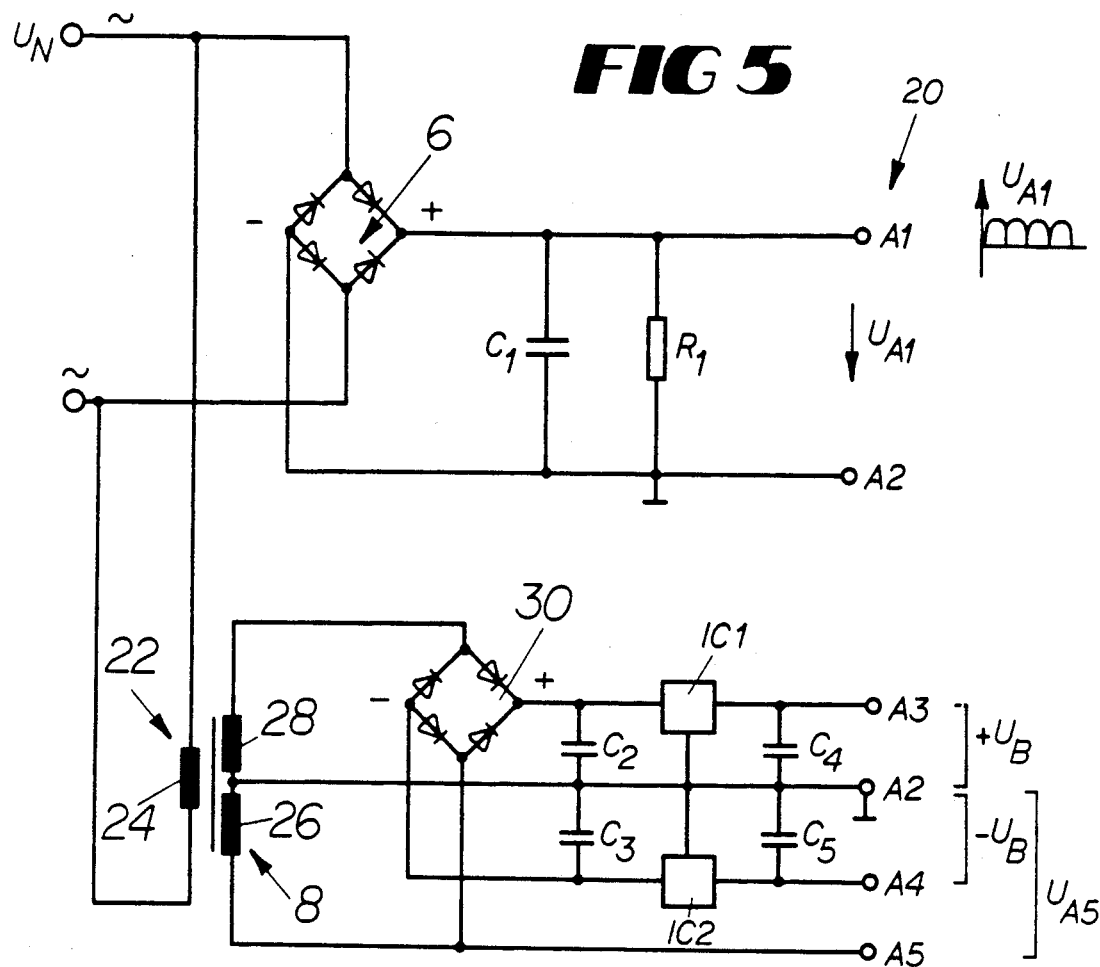
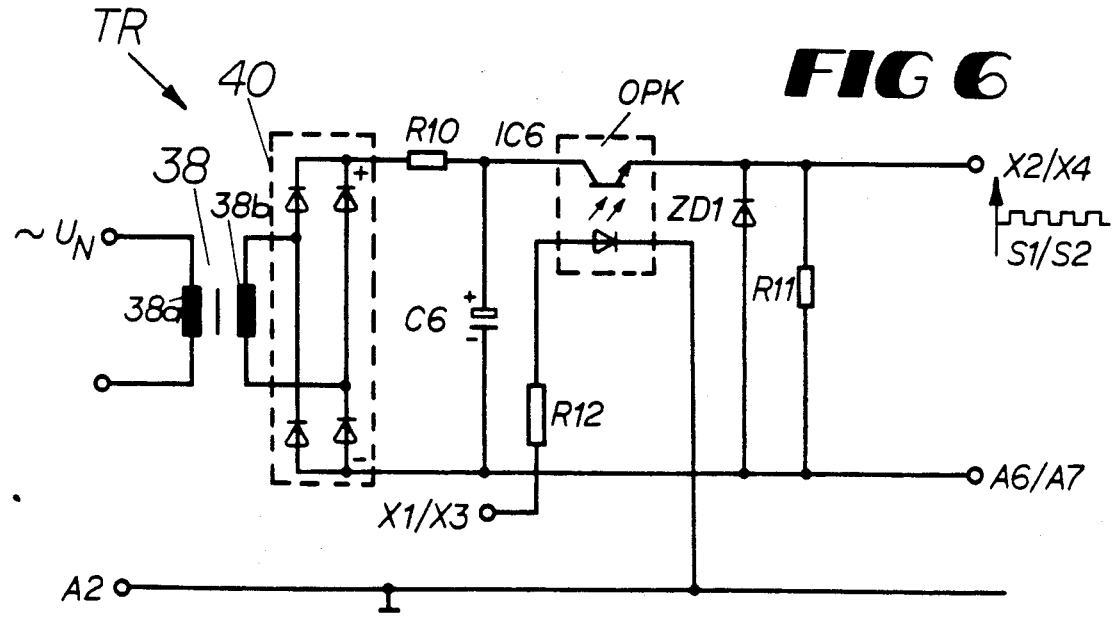

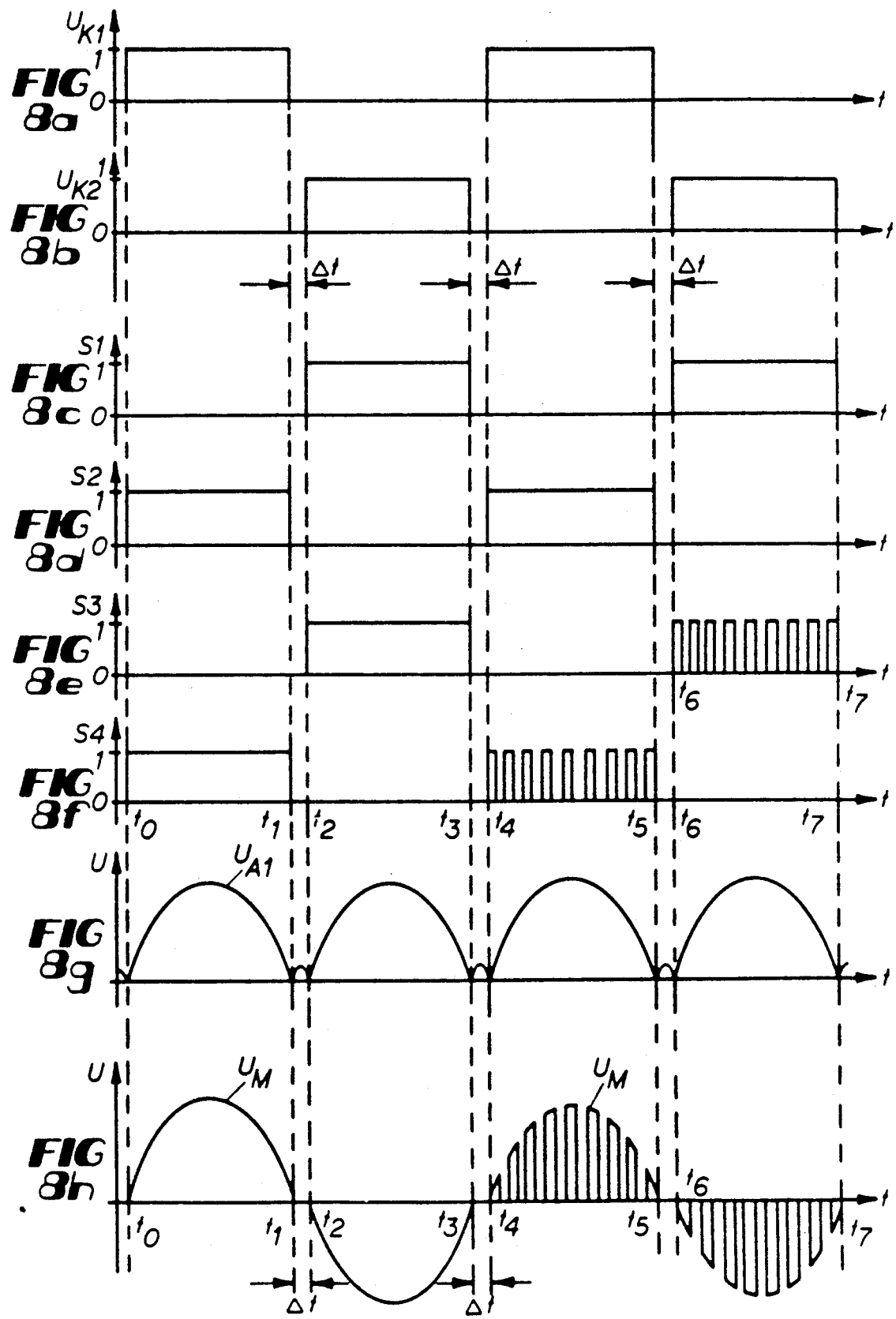

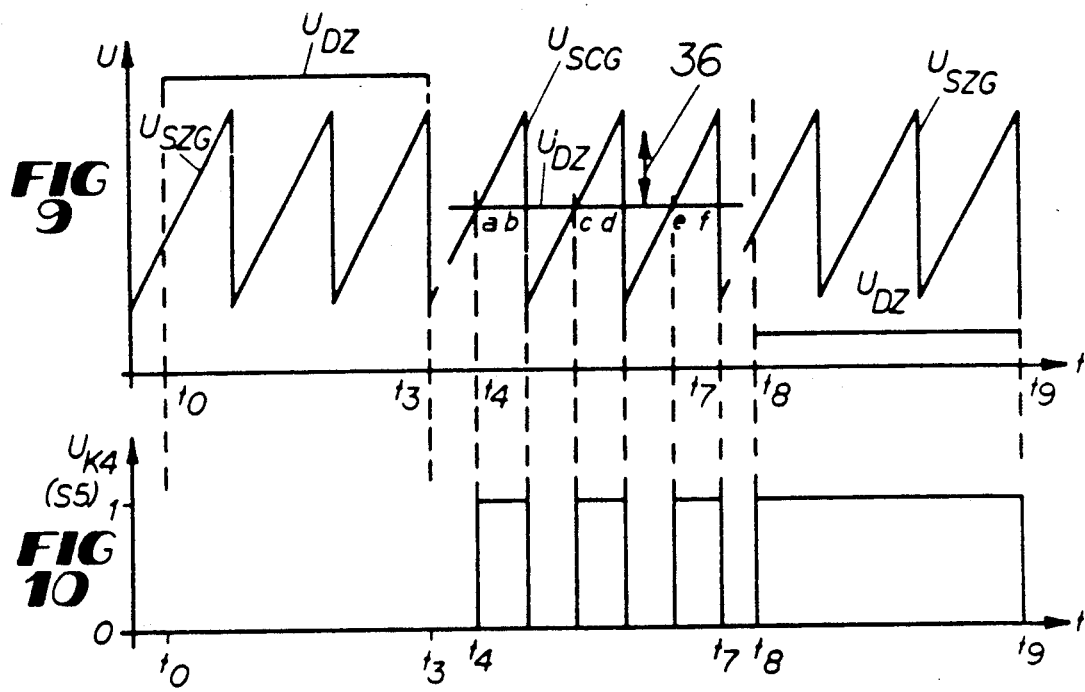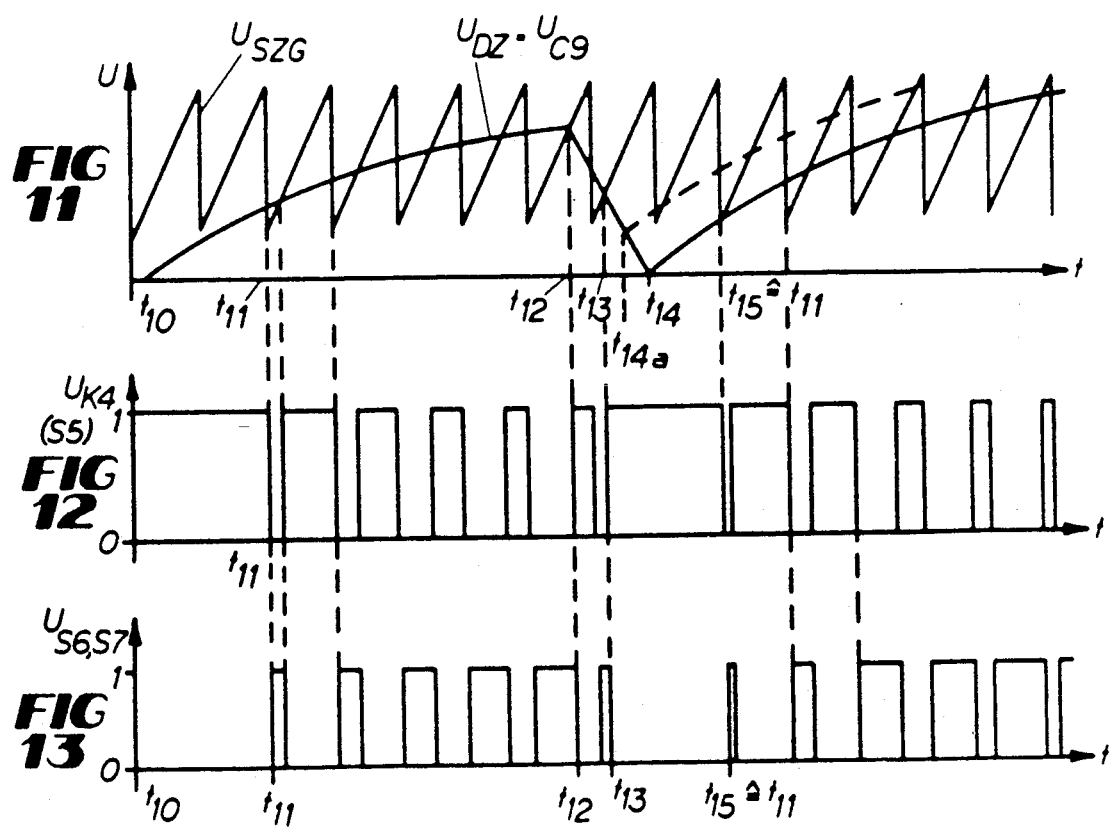

PROCESS FOR DRIVING AN ALTERNATING-CURRENT MOTOR AND AN ALTERNATING CURRENT MOTOR WHICH CAN BE DRIVEN IN ACCORDANCE WITH THIS PROCESS

FIELD OF THE INVENTION

The present invention relates to a method for driving an alternating-current motor, wherein a sinusoidal ac supply voltage is rectified into a dc voltage and wherein from this dc voltage—by means of a controllable polarity reversal—an ac motor voltage is produced, wherein the pulse width of the ac motor voltage can be modulated.

Furthermore, the invention relates to a controllable alternating-current motor with at least one motor winding, one supply voltage rectifier circuit, an output stage connected with the rectifier circuit by electronic switching elements in a bridge connection, wherein the motor winding is connected with a bridge shunt arm of the output stage, as well as with a control arrangement driving the electronic switching elements and is connected with a pulse-width modulator.

BACKGROUND OF THE INVENTION

A method process of this type is known for a three-phase alternating-current motor, i.e., a three-phase current motor. In this case, the sinusoidal ac supply voltage is rectified into a smoothed dc voltage and is directed—in the form of a supply voltage, to a bridge circuit output stage, consisting of two controllable power semiconductors. The power semiconductors are driven by a driver circuit in such a way that a square-wave ac voltage is produced from the supply dc voltage, wherein the pulse width of the square pulses of this square-wave ac voltage undergoes a pulse-width modulation to the extent that the current flow, resulting in the motor coils, receives a nearly sinusoidal shape due to the induction occurring in the motor windings. This means that a sinusoidal motor current is artificially synthesized by the pulse-width modulation of a square-wave voltage. However, in order to obtain the nearly sinusoidal motor current, it is necessary to reverse the polarity of the motor voltage by means of a pulse rate which constantly changes within a current cycle, i.e. the individual pulses of the square-wave ac voltage must possess varying pulse widths, respectively. A speed adjustment is obtained in that the motor voltage undergoes a pulse-width modulation to the extent that the amplitude of the resulting motor current changes. With the known process, this takes place, disadvantageously with a very extensive circuit layout, in particular for the driver circuit. In the known motor, this is realized by means of a very expensive special IC. Furthermore, it is very disadvantageous that the resulting motor current, depending on the number of "synthesis points," deviates more or less strongly from the sinusoidal shape, so that it has—in each case—a strong harmonic distortion factor, which in turn leads to loud motor noise.

SUMMARY OF THE INVENTION

For this reason, it is the task of the invention to present a process of the described type, as well as an alternating-current motor which can be driven in particular by means of this process, whereby a reduction in the running noise of the motor is achieved, as well as a reduction in required circuitry.

In accordance with the invention, this is achieved in that the ac supply voltage is rectified into a pulsing, nonsmoothed direct current with sinusoidal half waves and in that the polarity reversal occurs in accordance with the supply frequency in such a way that the ac motor voltage is essentially composed of the sinusoidal half waves of the pulsating direct current, wherein the motor speed can be altered in that the ac motor voltage is synthesized into pulse-width modulatable voltage pulses with a constant pulse rate lying outside the range of hearing.

Thus, in accordance with the invention, the motor voltage as well as the motor current have practically an exactly sinusoidal and, accordingly, also a distortion-free course, which leads to the desired reduction in the motor's running noise.

Due to the timing of the ac voltage of the motor, provided for the speed adjustment, with a pulse rate which is constant in accordance with the invention, a simple driver circuit may be used, wherein the level of the pulse rate ensures quiet, practically inaudible motor operation with the exception of the mechanical running noise. Through the pulse width modulation of the voltage pulses, the area below the voltage curve (integral of the motor voltage), determining the motor output or speed, is variable, wherein also the individual pulses of the motor voltage exactly follow the sinusoidal form.

By means of an example shown in the drawing, the invention is to be explained further.

BRIEF DESCRIPTION OF THE DRAWING

FIG. 5 a circuit for the current or voltage supply of the motor of the invention, as well as the driver circuit, in accordance with FIG. 4;

FIG. 6 a detailed illustration of one of the driver stages shown in FIG. 4 only in simplified form;

FIGS. 8a through 8g the time progression of additional voltage and control signals provided for producing the motor voltage shown in FIG. 8h;

FIG. 8h the progression of the motor voltage during the highest rate of evolutions on the one hand and, on the other hand, during a certain reduced number of revolutions;

FIGS. 9 and 10 voltage signals illustrating the speed control by means of pulse-width modulation and FIGS. 11 through 13 voltage signals illustrating the starting phase of the motor of the invention.

In the various figures, similar parts, components, signals, voltages, etc., are each provided with the same reference symbols. FIG. 1 shows an alternating-current motor (2), which receives its motor ac voltage $U_M$ (see also FIG. 8h) from a power output stage (4), the circuit of which is shown in detailed form in FIG. 3 and which will be further described in the following text. The output stage (4) has four control signals (S1, S2, S3, and S4), two supply voltage inputs (E1 and E2), as well as two voltage outputs (M1 and M2), connected with the motor (2).

Figure 1:
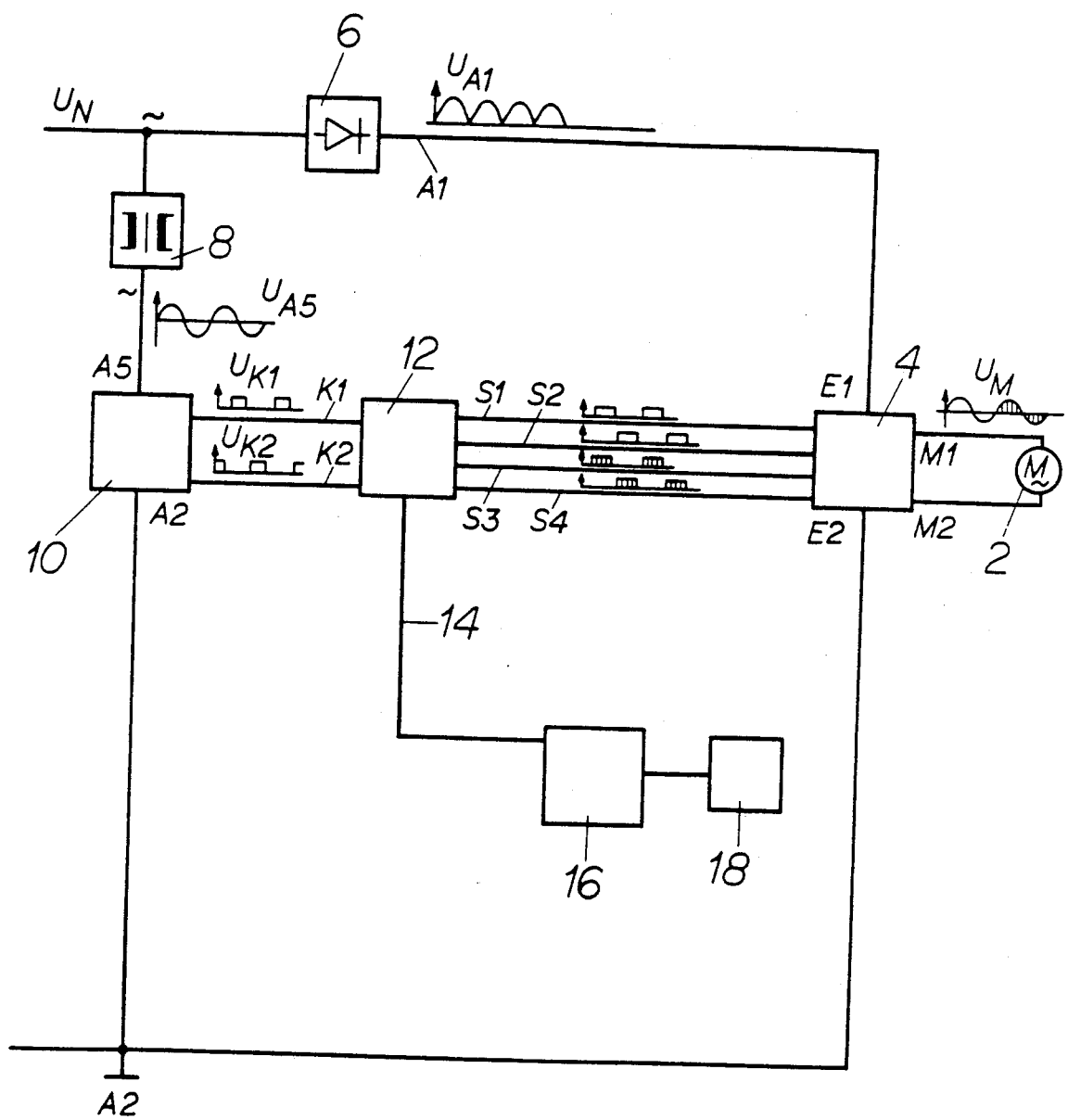
FIG. 1 a block diagram of the alternating-current motor of the invention.

A sinusoidal supply ac voltage ($U_N$) is rectified—in accordance with the invention—via a bridge or full-wave rectifier (6) in such a way that a pulsating, unsmoothed dc voltage ($U_{A1}$) with sinusoidal half waves is produced (see also FIG. 8g), which is directed to the output stage (4) via the inputs (E1, E2). The magnitude of the pulsating dc voltage ($U_{A1}$) amounts, for example, to approximately 300 V.

Furthermore, from the supply voltage ($U_N$) and via a mains transformer (8), a sinusoidal ac voltage ($U_{A5}$) (FIG. 7a), which is in phase with the latter and has a particularly low voltage level of, for example, approximately 15 V, which varies from the supply voltage ($U_N$), is shunted and directed via a line (A5) and a ground line (A2) toward the inputs of a driver circuit (10) in the form of an input and reference voltage. This driver circuit (10) is shown in greater detail in FIG. 4 and is referred to in further detail later in the text. As is also explained in the following text, the driver circuit (10) produces through comparison with two internally provided reference voltages, two output signals ($U_{K1}$ and $U_{K2}$), which are directed to a switching circuit (12) via the lines (K1 and K2), which in turn, based on these signals ($U_{K1}$ and $U_{K2}$), produces the four control signals (S1 to S4) for driving the output stage (4).

In order to regulate the rpm of the motor (2) of the invention, a pulse-width modulator (16) is connected with the switching circuit (12), over a line (14), and with the former, a speed controller (18) is connected.

In the following text, the individual components of the motor circuit arrangement of the invention are described more precisely.

FIG. 5 shows a circuit (20) for the voltage supply of the motor or motor circuit arrangement of the invention. This voltage supply circuit (20) delivers various voltages which are required for the motor circuit of the invention.

At first, from the supply voltage ($U_N$) and via the rectifier (6), which is in a known form of a diode bridge circuit, the pulsating dc voltage ($U_{A1}$) is formed, which is present in lines (A1 and A2).

Furthermore, the voltage supply circuit (20), in accordance with FIG. 5, has a transformer (22) with a primary winding (24), connected to the supply voltage ($U_N$) and two series-connected secondary windings (26 and 28), wherein the primary winding (24), together with the one secondary winding (26), forms the transformer (8) (see FIG. 1), supplying the reference voltage ($U_{A5}$). The voltage ($U_{A5}$) is present between the lines (A5 and A2 (ground)), for example at approximately 15 V.

To the secondary side of the transformer (22), formed by the two series-connected secondary windings (26 and 28), a bridge rectifier (30) is connected. The plus-output of the rectifier (30) is connected with a line (A3) via a positive fixed voltage regulator (IC 1) and the minus-output is connected with a line (A4) via a negative fixed voltage regulator (IC 2). The ground line (A2) is connected with the common point between the two secondary windings (26, 28) In this way, a positive dc voltage ($+U_B$) exists between the line (A3) and the ground line (A2), and between the line (A4) and the ground line (A2) a negative dc voltage ($-U_B$) exists.

Figure 4:
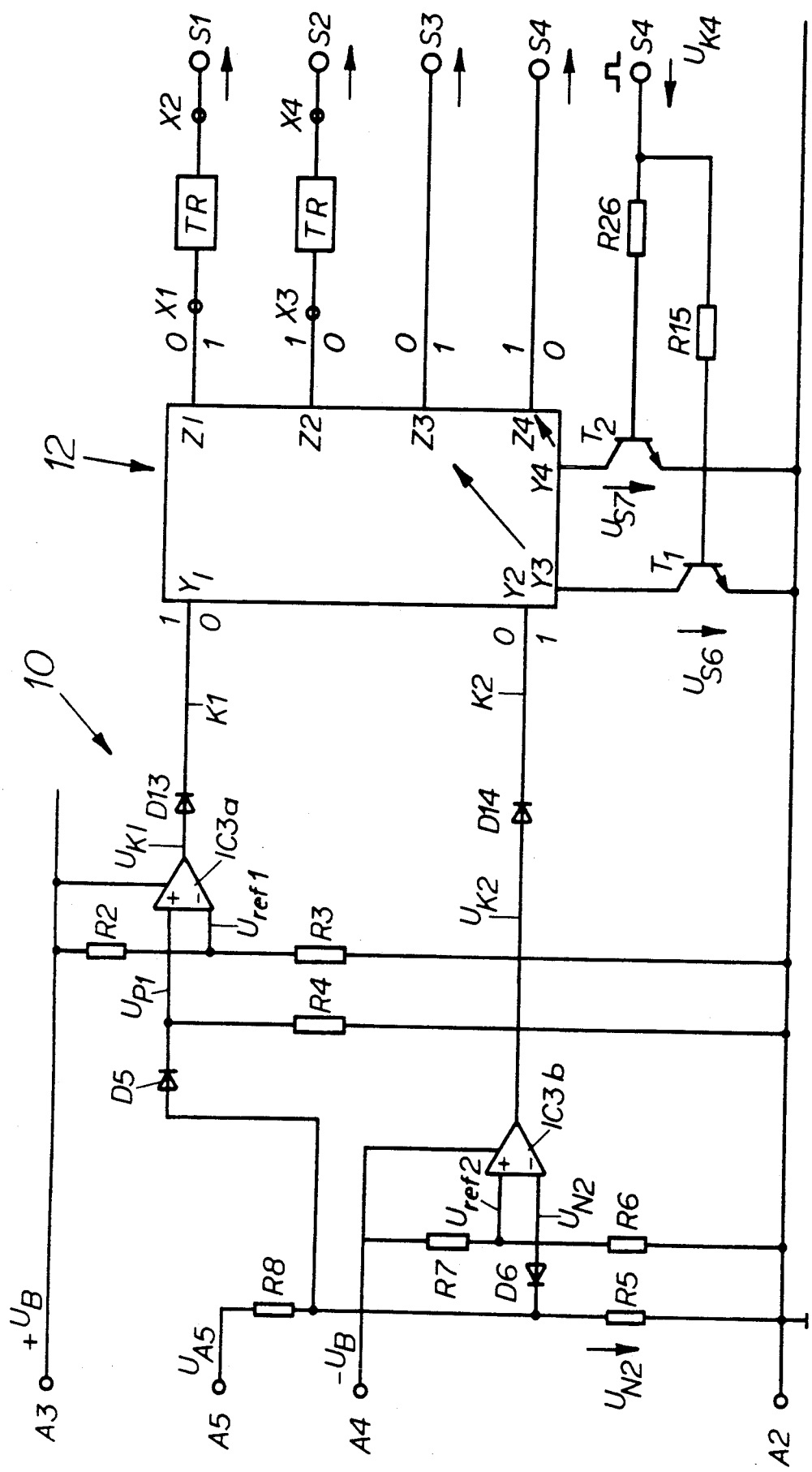
FIG. 4 a driver circuit for driving the output stage, in accordance with FIG. 3.

In accordance with FIG. 4, the voltages ($+U_B$, $-U_B$, and $U_{A5}$) are directed via the lines (A3, A4, and A5) to the driver circuit (10). The voltage ($+U_B$) (lines A3 and A2) is present at a voltage divider, formed by two series-connected resistances (R2 and R3). Also the voltage ($-U_B$) (lines A4 and A2) is present at a voltage divider consisting of a series-connection of two resistances (R7 and R6). Finally, also the voltage ($U_{A5}$) (lines A5 and A2) is present at a voltage divider (R8 and R5).

The central tap of the voltage divider (R2/R3) is connected with the inverting input of a first comparator (IC3a). The level of this positive dc voltage ($U_{ref1}$) amounts, for example, to approximately 0.1 V. The central tap of the voltage divider (R7/R6) is not connected with the inverting input of a second comparator (IC3b), wherein the height of this negative reference voltage ($U_{ref2}$), for example, amounts to $-0.1$ V.

At the central tap of the voltage divider (R8/R5), as determined by the voltage ($U_{A5}$) and the resistance ratio (R8/R5), an alternating current of approximately 4.7 V is present. The central tap between the resistances (R8 and R5)—on the one side—is connected via a diode (D5), biased for positive voltages in the forward direction, with the noninverting input of the first comparator (IC3a), and—on the other side, via a diode (D6) which is biased for negative voltages in the forward direction—with the inverting input of the second comparator (IC3b). The voltage at the noninverting input of the first comparator (IC3a) is identified by ($U_{p1}$) and the voltage at the inverting input of the second(ary) comparator (IC3b) is identified by ($U_{N2}$) (see also FIGS. 7b and 7c).

The output of the first comparator (IC3a) is connected with an input (Y1) of the switching circuit (12) via a line (K1) and a diode (D13), biased in the forward direction. The control signal transmitted via the line (K1) is identified by ($U_{K1}$). In an analog arrangement hereto, the output of the secondary comparator (IC3b) is connected via a line (K2) and a diode (D14) in a forward direction with a second input (Y2) of the switching circuit (12). The control signal, transmitted via the line (K2), is identified by ($U_{K2}$) (see also FIGS. 7d and 7e).

The switching circuit (12) has four control outputs (Z1, Z2, Z3, and Z4) for the control signals (S1, S2, S3, and S4). Furthermore, the switching circuit (12) has two additional inputs (Y3 and Y4), which influence the outputs (Z3 and Z4), as will be explained further. The additional inputs (Y3 and Y4) are each connected with the ground line (A2) via the collector/emitter line of a transistor (T1 or T2 . The bases of the transistors (T1 and T2) are connected with a common drive line (S5) via one base resistance (R15 or R26) each.

As can also be seen in FIG. 4, in each of the output lines of the outputs (Z1 and Z2) of the switching circuit (12), which carry the control signals (S1 and S2), a carrier stage (TR) is connected via connection points (X1, X2 or X3, X4). The layout of the driver stages (TR) is illustrated more precisely in FIG. 6 and will be explained further at a later point.

Figure 3:
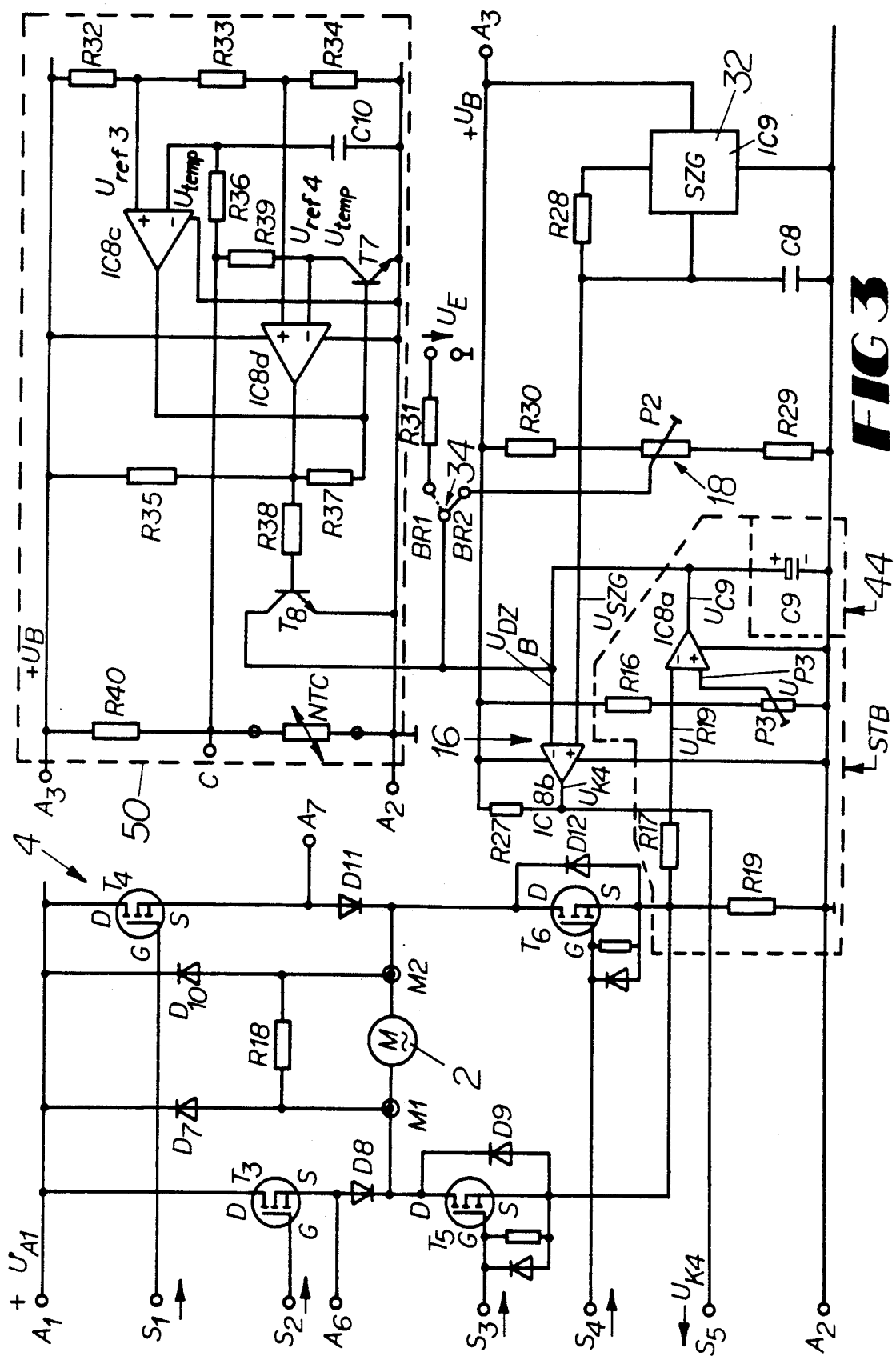
FIG. 3 a primary portion of the circuit arrangement of a motor of the invention, provided, along with other features, with an output stage and a pulse-width modulator.

In accordance with FIG. 3, the output stage (4) consists of four power semiconductors, connected in an H-bridge circuit, in particular of field effect transistors (FETs) (T3, T4, T5, and T6). In the case of the FETs, an n-channel MOSFET with drain (D), source (S) and gate (G) is involved in the example. The H-bridge connection consists of two parallel bridge arms, each provided with two series-connected FETs (T3) and (T5), as well as (T4 and T6), wherein the motor (2) is connected within the shunt arm of the bridge circuit between the FETs (T3 and T5), on the one side, and between the FETs (T4 and T6), on the other side. Furthermore, in each bridge arm, a diode (D8 or D11) lies in series with the FETs (T3, T5 or T4, T6). The drain electrodes (D) of the "upper" FETs (T3 and T4) are each connected with the line (A1), carrying the pulsating direct current ($U_{A1}$), and the source electrodes (S) of these FETs (T3, T4) are connected with the drain electrodes (D) of the "lower" FETs (T5 or T6) via the anode-cathode line of the diodes (D8 or D11). The source electrodes (S) of the "lower" FET (T5, T6) are connected to the ground line (A2) via a common, low-ohm resistance (R19). In order to drive the FETs, their gate electrodes (G) are connected with the lines carrying the control signals (S1 to S4), i.e., T4 with S1, T3 with S2, T5 with S3, and T6 with S4.

In the following, the function of the motor (2) of the invention or of the drive of the invention will be explained, i.e., in the beginning, without measures for controlling the rpm.

In accordance with FIG. 4, at the inverting input of the first comparator (IC3a), the constant reference voltage ($U_{ref1}$) of approximately 0.1 V is present and at the noninverting input, the positive half wave ($U_{p1}$) of approximately 4.7 V of the ac voltage tapped at the voltage divider (R8/R5) is present.

At the noninverting input of the second comparator (IC3b) the constant reference voltage ($U_{ref2}$) of approximately −0.1 V, and at the inverting input of the negative half wave ($U_{N2}$) of −4.7 V of the voltage tapped at the voltage divider (R8/R5), are present.

Figure 7A:
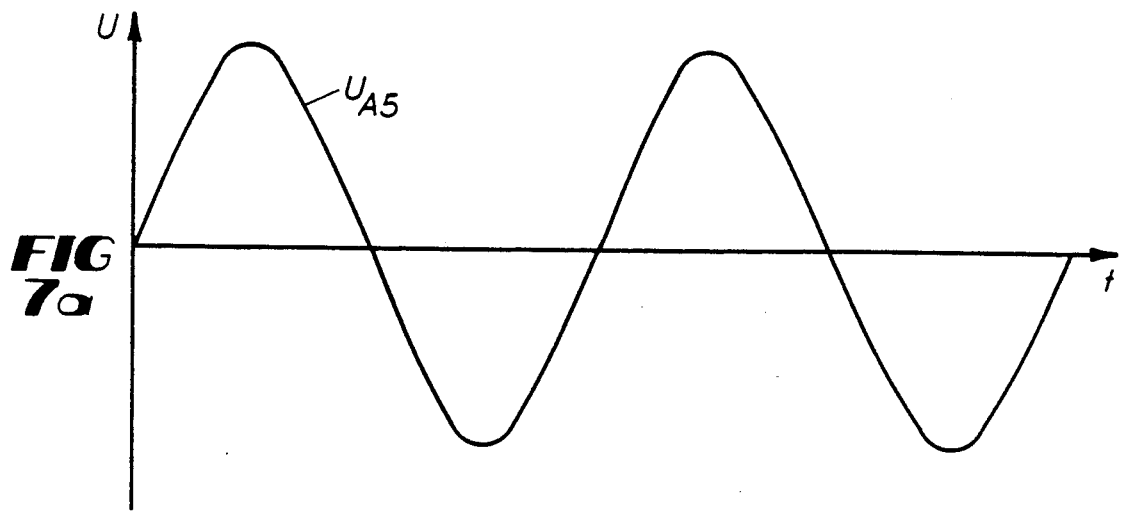
FIGS. 7a through 7e the time progression of various voltage and control signals.
Figure 7B:
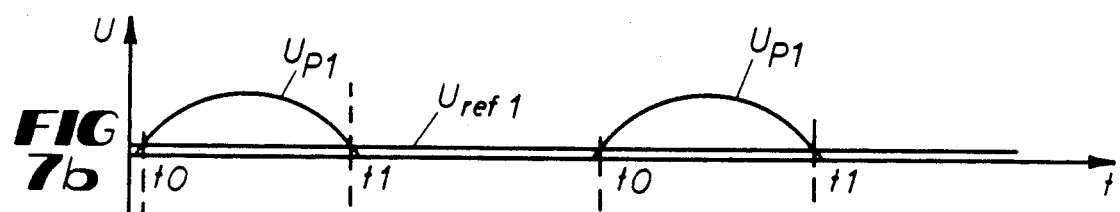
Figure 7C:
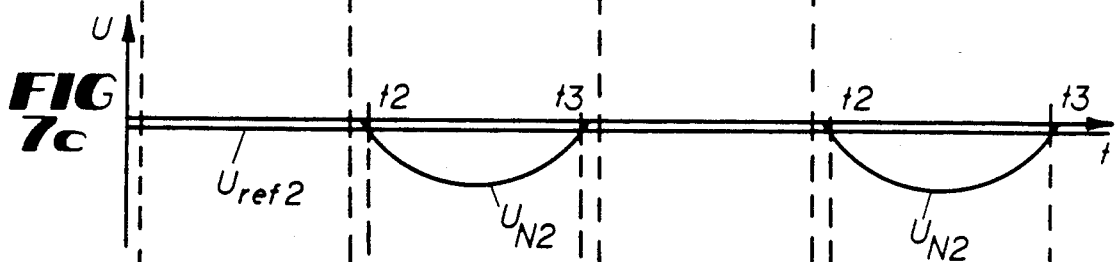

In FIG. 7a, the time slope of the voltage ($U_{A5}$) is shown. Furthermore, in the FIGS. (7b and 7c), the voltage signals ($U_{p1}$ or $U_{N2}$), which are derived from the voltage ($U_{A5}$), together with the respective reference voltages ($U_{ref1}$ and $U_{ref2}$), are shown.

Figure 7D:
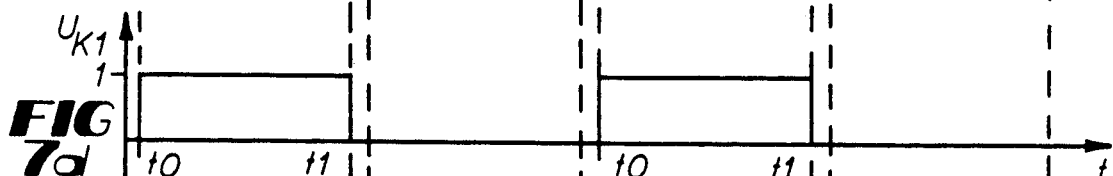

At first, let us observe the processes at the first comparator (IC3a). At the first comparator (IC3a), the voltage ($U_{p1}$) of the positive half wave rises from zero and lies, at first, below the reference voltage ($U_{ref1}$). The output signal ($U_{K1}$) of the first (primary) comparator (IC3a), as shown in FIG. 7d, is therefore 0. With increasing voltage of the positive half wave of the voltage ($U_{p1}$), the point of intersection with the reference voltage ($U_{ref1}$) is obtained. This occurs at the moment ($t_o$) in FIG. 7b. At this point, the comparator (IC3a) connects through and gives a positive output signal at its output at the level of the voltage (+$U_B$)—in the form of an output signal ($U_{K1}$) which lasts until the declining slope of the positive half wave of the voltage ($U_{p1}$) again falls below the reference voltage ($U_{ref1}$)—as is the case at time ($t_1$).

Figure 7E:
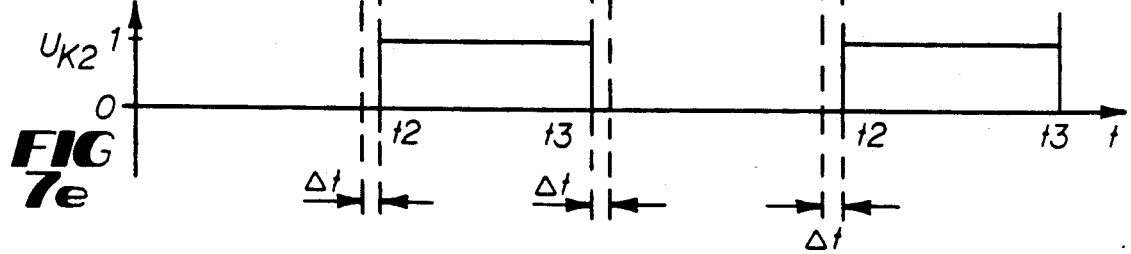

In the case of the second comparator (IC3b), analogous processes result. If the negative half wave of the voltage ($U_{N2}$) (FIG. 7c) falls below the reference voltage ($U_{ref2}$) within time ($t_2$), the second comparator (IC3b) gives off a positive output signal ($U_{K2}$), which is shown in FIG. 7e. This signal ($U_{K2}$) lasts until the negative half wave of the voltage ($U_{N2}$) again exceeds the value of the reference voltage ($U_{ref2}$) (time $t_3$).

In the continuing description, for purposes of simplification, the presence of a voltage influencing the through-connection of a corresponding transistor is designated as a logical "1" and the voltage value of approximately 0 V is referred to as "0."

In the above-described manner, between the output signals ($U_{K1}$ and $U_{K2}$) of the two comparators (IC3a and IC3b), contact breaks $\Delta t = t_2 - t_1 = t_o - t_3$ are formed, wherein within these contact breaks $\Delta t$ both output signals ($U_{K1}$ and $U_{K2}$) lie at logical "0," as can be clearly seen in FIGS. 7d and 7e. The purpose of this measure is to safely avoid the simultaneous connection of both bridge arms of the output stage (4) and to ensure that no overlapping occurs.

The switching circuit (12) controls the selection of the transistors (T3 to T6) of the output stage (4), in accordance with FIG. 3, and it also determines the latter's triggering point times. For this purpose, the signals (S1 to S4) are produced in such a way that at ($U_{K1}$)=logical "1" and ($U_{K2}$)=logical "0," the outputs (Z2 and Z4) of the switching circuit (12) have the logical potential "1" and the outputs (Z1 and Z3) have logical "0." In the reverse case, i.e., when at the output of the second comparator (IC3b) the signal ($U_{K2}$)=logical "1" and at the output of the first comparator (IC3a) the signal ($U_{K1}$)=logical 0 is present, then logical "1" is present at the outputs (Z1 and Z3) of the switching circuit (12) and at the outputs (Z2 and Z4) logical "0" is present.

The control signals (S1 to S4), obtained via the outputs (Z1 and Z4), are illustrated in FIGS. 8c to 8f. Again, the FIGS. 8a and 8b show the output signals ($U_{K1}$) or ($U_{K2}$) of the two comparators (IC3a and IC3b) in corresponding time coordination with the control signals (S1 to S4).

The coordination between the signals ($U_{K1}$ and $U_{K2}$) and the control signals (S1 to S4), as realized in the switching circuit, can be illustrated by the following function table:

| Input | | Output | | | |
|---|---|---|---|---|---|
| Y1 ($U_{K1}$) | Y2 ($U_{K2}$) | Z1 (S1) | Z2 (S2) | Z3 (S3) | Z4 (S4) |
| 0 | 0 | 0 | 0 | 0 | 0 |
| 1 | 0 | 0 | 1 | 0 | 1 |
| 0 | 1 | 1 | 0 | 1 | 0 |
| 1 | 1 | 0 | 0 | 0 | 0 |

In the last line of the above table, the theoretically impossible state $U_{K1}=1$ and $U_{K2}=1$ is shown which could occur in case of a defect at the comparators (IC3a and IC3b). However, in this hypothetical case, it is advantageously assured that driving of the output stage transistors (T3 to T6) does not occur.

By means of the drive signals (S1 to S4), the gate electrodes (G) of the power transistors (T3 to T6) are driven. When the FETs (T3 and T6) are driven via the signals (S2 and S4), this results in a current flow from the line (A1) via (T3, D8), motor (2), (T6), and (R19) to the minus line (A2). When the FETs (T4 and T5) are controlled via the signals (S1 and S3), a current flow from the line (A1) via (T4), (D11), motor (2), (T5), and (R19) to the minus line (A2) occurs.

The output stage transistors (T3 to T6) are driven, in accordance with the invention, with a frequency corresponding to the supply frequency, whereby due to the pulsating direct current ($U_{A1}$), present at the line (A1), which is demonstrated in FIG. 8g, and due to the alternating connection of the transistors (T3, T6 or T4, T5) at the motor (2)—regardless of the contact breaks $\Delta t$—the exact sinusoidal ac voltage ($U_M$), in accordance with FIG. 8h, (within the time span of $t_o$ to $t_3$) is present.

Thus, from the pulsating dc voltage ($U_{A1}$), a sinusoidal ac voltage is produced, wherein it is assured that an overlapping of the drive signals, which would result in the simultaneous through-connection of all bridge transistors (T3 to T6), will surely be avoided.

The description up to this point, with respect to the time span ($t_0$ to $t_3$), was based on the fact that the drive line (S5) is signal-free, i.e. it is at logical "0." Therefore, the two transistors (T1 and T2) (FIG. 4) are in the nonconductive state, so that the additional inputs (Y3 and Y4) of the switching circuit (12) are "not switched in". As a result, the described drive function via the outputs (Z1 to Z4) or the drive control signals (S1 to S4) for a maximum number of revolutions of the motor (2) is assured.

In accordance with the invention, there exists still the possibility of changing the drive control signals through clocking of transistors (T5 and T6) through one, via the drive line (S5), via a control signal ($U_{K4}$) (FIG. 10), as well as via the transistors (T1 and T2), which takes place by means of the pulse-width modulation described in the following text.

In accordance with FIG. 3, the pulse-width modulator (16) consists essentially of an "rpm" comparator (IC8b) and of a sawtooth generator (32), the output of which is connected with the noninverting input of the rpm comparator (IC8b). The sawtooth generator (32) produces a sawtooth voltage ($U_{SZG}$), which is superposed on a dc voltage (see also FIG. 9), wherein the sawtooth voltage frequency—in accordance with the invention—lies above the audible frequency, i.e., particularly near approximately 20 kHz. The potential level of the sawtooth voltage ($U_{SZG}$) lies, for example, in the range between 4 V and 8 V. The inverting input of the comparator (IC8b) is connected via a point B and possibly—via a contact (BR2) of a selector switch (34)—with the friction contact of a speed-controlling potentiometer (P2), forming the speed controller (18) (FIG. 1). The speed-controlling potentiometer (P2) is arranged in series between two resistances (R29 and R30) and with these forms a voltage divider (R29/P2/R30). Depending on the resistance ratio of this voltage divider and the setting of the friction contact of the potentiometer (P2), a reference or rpm voltage ($U_{DZ}$) (FIG. 9) is set and is directed to the inverting input of the rpm comparator (IC8b). The output of this comparator (IC8b) is connected with the drive line (S5) and produces an output signal ($U_{K4}$) (FIG. 10), which drives the transistors (T1 and T2) via the resistances (R15, R26) (FIG. 4).

In the following text, the function of the pulse-width modulator (16) and of the speed controller (18) will be explained, in particular with the aid of FIGS. 9 and 10.

In FIG. 9, the abscissa (time t) is divided into three areas, in which three different voltage controls of the reference voltage ($U_{DZ}$) are recorded, which are undertaken by the speed setting potentiometer (P2). Thus, for the sake of a better overview, the transition processes during speed-setting changes or changes in the reference voltage ($U_{DZ}$) were not illustrated.

Within the time span of $t_0$ to $t_3$, the reference voltage $U_{DZ}$) is set by means of the potentiometer (P2) to a value which is greater than the maximum amplitude of the sawtooth voltage ($U_{SZG}$). As a result, the voltage ($U_{DZ}$) at the inverting input of the comparator (IC8b) is consistently higher than the voltage ($U_{SZG}$) at the noninverting input so that, consequently, the output signal ($U_{K4}$) constantly lies at logical "0" (FIG. 10). For this reason, the drive line (S5) is "signal-free," so that the transistors (T1 and T2) remain in the nonconducting state. Thus, the above-described conditions exist at a maximum rate of revolutions (compare the time interval $t_0$ to $t_3$ in FIG. 8a to 8h).

If the voltage ($U_{DZ}$) at the speed-controlling potentiometer (P2) is reduced, the intersecting points a, b, c, d, e, f with the sawtooth voltage ($U_{SZG}$) result, as is shown in the time interval ($t_4$ to $t_7$) in the FIGS. 9 and 10. The output signal ($U_{K4}$) of the comparator (IC8b) is always logical "0" when ($U_{DZ} > U_{SZG}$), and it is a logic "1" when ($U_{DZ} < U_{SZG}$). In this way, the square-wave pulses ($U_{K4}$) result in the frequency of the sawtooth voltage ($U_{SZB}$), wherein these pulses ($U_{K4}$) drive the transistors (T1 and T2) via the drive line (S5) in a synchronized manner (FIG. 4). The transistors (T1 and T2), in the through-connected state, i.e. when ($U_{K4}$)="1", apply ground potential to the additional inputs (Y3 and Y4) of the switching circuit (12). The additional inputs (Y3 and Y4) influence the control signals (S3 and S4), present at the outputs (Z3 and Z4) in such a way that during ground potential at the additional inputs (Y3, Y4) there exists consistently, i.e., independently of the signals at the inputs (Y1 and Y2), the logical "0" at the outputs (Z3 and Z4), i.e. S3=S4="0." Since the signals (S3 and S4) control the output stage transistors (T5 and T6), this results in a synchronization of the motor voltage ($U_M$) within the time span of ($t_4$ to $t_7$) (compare also with FIGS. 8e, 8f, and 8h).

By changing the voltage ($U_{DZ}$) at the potentiometer (P2), the voltage ($U_{DZ}$) in FIG. 9 is displaced in the direction of the double arrow (36), whereby also the distances between the intersecting points (a) and (b), (c), and (d), etc. are changed. However, since these distances define the pulse duration or "pulse width" of the voltage pulses ($U_{K4}$), a pulse-width modulation of the voltage pulses ($U_{K4}$) takes place, and thus also of the motor voltage ($U_M$), via the transistors (T1 and T2), which synchronize the control signals (S3 and S4) via the additional inputs (Y3 and Y4) and the outputs (Z3 and Z4) of the switching circuit (12). By means of the described pulse-width modulation, the surface areas (voltage integral), which result below the voltage curve of the motor voltage ($U_M$) (FIG. 8h), are variable, so that the rate of revolutions of the motor can be varied from 0 to maximum speed in a stepless manner.

Within the time span of ($t_8$ to $t_9$) (FIGS. 9 and 10), the case is demonstrated wherein the reference voltage ($U_{DZ}$) is always smaller than the minimum amplitude of the sawtooth voltage ($U_{SZG}$). Accordingly, the output signal ($U_{K4}$) of the comparator (IC8b) is always logical "1," so that the transistors (T1 and T2) are constantly connected through via the drive line (S5) and apply ground potential to the additional inputs (Y3, Y4) of the switching circuit (12), which results in, in each case, the control signals (S3 and S4), i.e., also independently of the signals at the inputs (Y1 and Y2) of the switching circuit (12), logical "0." For this purpose, the transistor (T1) influences the output (Z3) via the input (Y3) and thus the control signal (S3). The transistor (T2) influences the output (Z4) and the control signal (S4) via the input (Y4). These "0" signals (S3 and S4) "force" the output stage transistors (T5 and T6) to be maintained in the nonconnected state, which leads to a standstill of the motor (rpm=0).

In an additional arrangement of the invention, it is possible, as already indicated above, to connect the contact (BR2) of the selector switch (34) in the connection line between the friction contact of the speed-controlling potentiometer (P2) and the point (B) or the inverting input of the rpm comparator (IC8b). The selector switch (34) has a second contact (BR1), via, which, through a switchover process (R31), an external control voltage ($U_E$)—in place of the variable speed voltage and serving as a reference voltage—can possibly be directed to point (B) and to the inverting input of the comparator (IC8b), wherein the level of this control voltage ($U_E$) corresponds to the voltage ($U_{DZ}$) to be set at the potentiometer (P2).

In the following text, the layout of the driver stages (TR), which may preferably be connected in the control lines (S1 and S2), as already briefly mentioned above, is to be explained further (FIG. 4).

In accordance with FIG. 6, each driver stage (TR) has a mains transformer (38), the primary winding (38a) of which lies at the supply voltage ($U_N$) and the secondary winding (38b) of which is connected with a rectifier bridge circuit (40). For the purpose of smoothing the voltage, a resistance (RIO) is series-connected with the rectifier circuit (40) and a capacitor (C6) is connected parallel to the rectifier circuit (40). The plus line is connected with the collector of the secondary side of an optical coupler (OPK). The emitter of the optical coupler (OPK) is connected with the output (X2) or (X4) of the drive stage (TR). The minus line, which is connected to the "minus point" of the rectifier circuit (40), lies at an output (A6) or (A7). The output (A6) is connected with the source electrode (S) of the output stage transistor (T3) and the output (A7) is connected with the source electrode (S) of the output stage transistor (T4) (see FIG. 3). The input (X1 or X3) of the drive stage (TR) is connected with the primary side, such as a light-emitting diode of the optical coupler (OPK), via a resistance (R12), wherein the light-emitting diode is connected on the other side to the ground line (A2). Parallel to the output lines (X2 or X4) and (A6 or A7), a zener diode (ZD1) can be connected for the elimination of possibly occurring voltage peaks. An additional resistance (R11), connected parallel to the zener diode (ZD1), serves to provide a defined output signal of 0 V at the output (X2 or X4), which brings about the discharge of the gate electrode (G) for the purpose of blocking the output phase transistors (T3 or T4) during the blocking stage of the optical coupler (OPK).

The function of the driver stage is as follows. Via the transformer (38) and the rectifier circuit (40), a dc voltage is produced which is smoothed via the resistance (R10) and the capacitor (C6). The collector/emitter path of the optical coupler (OPK) lies in the plus line, wherein it becomes conductive as soon as the primary side is provided with a logical "1" signal via (X1) or (X3). In this way, depending on the signal (S1) or (S2) of the switching circuit (12), a square voltage of, for example, approximately 12 V is produced at the output (X2) or (X4), which represents the actual control signal (S1 or S2) for driving the output stage transistors (T4 or T3). In this way, a galvanic separation between the input (X1) or (X3) and the output (X2) or (X4) is obtained.

Figure 2:
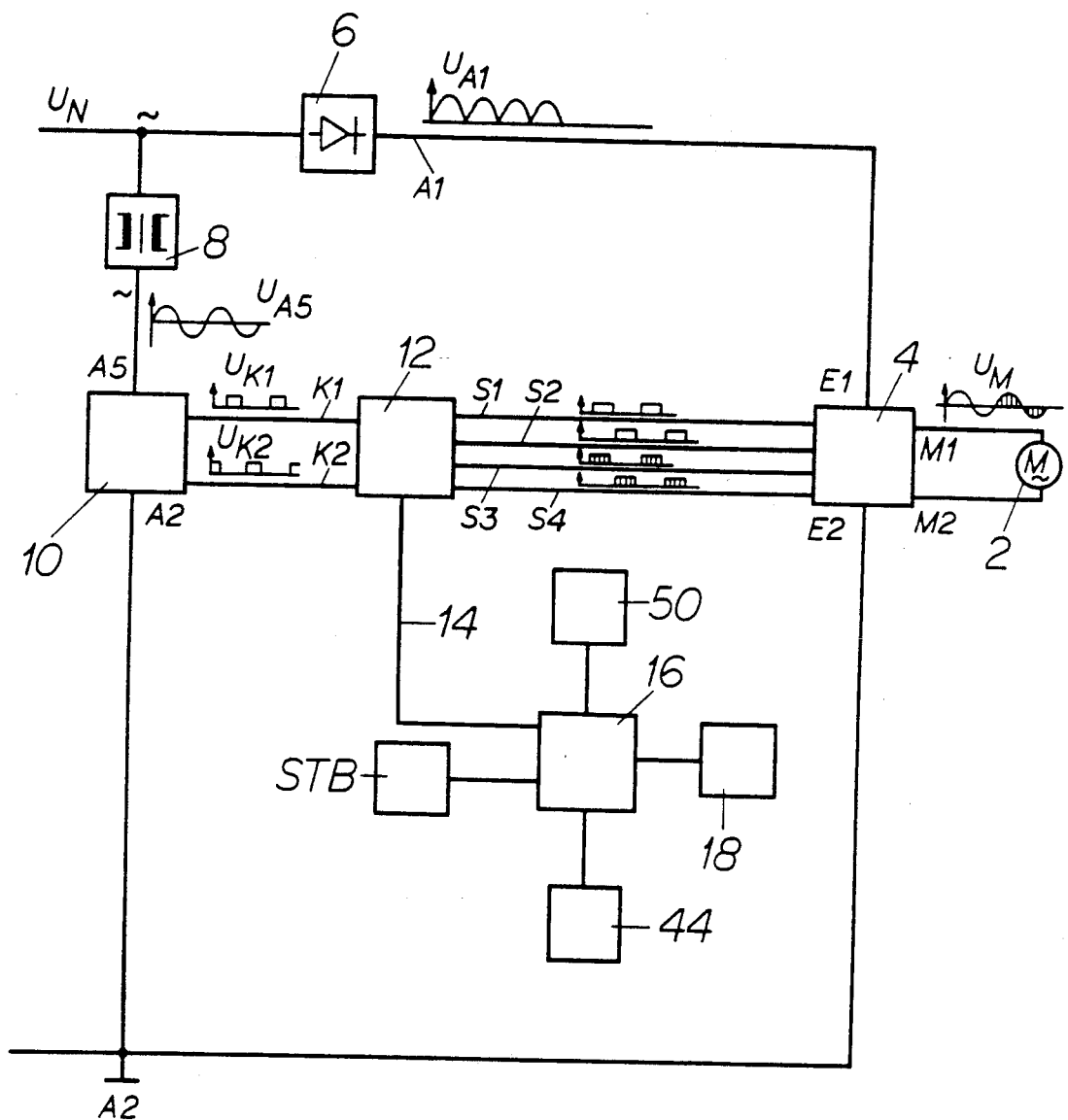
FIG. 2 a block diagram, as in FIG. 1, in an expanded version.

In accordance with FIG. 2, in an advantageous additional arrangement of the invention, a current-limit arrangement (STB) and an arrangement (44) for the gradual start of the motor (2) are provided, wherein these additional arrangements are also connected with the pulse-width modulator (16).

In the following text, these steps, in accordance with the invention, for starting the motor (2), as well as for the protection of the motor (2) against overcurrent, i.e. for current limitation, will be described.

In accordance with FIG. 3, the current-limiting arrangement (STB) (defined by a dotted line) has the low-ohm resistance (R19), which is connected to the electric circuit and via which the voltage decline, brought about by the corresponding motor current, is determined. The connection point between the resistance (R19) and the output stage transistors (T5 or T6) is connected via a resistance (R17) with the inverting input of an additional comparator ("current comparator") (IC8a). The noninverting input of this current comparator (IC8a) is connected with the friction contact of a current-adjusting potentiometer (P3), which, together with a series-connected resistance (R16), forms a voltage divider at the dc voltage ($+U_B$) of, for example, approximately 12 V. The output of the current comparator (IC8a) is, on the one hand, connected with the central switching point (B, i.e. the inverting input of the rpm comparator (IC8b) and, on the other hand, with the positive connection of a capacitor (C9), forming the gradual starting arrangement (44), wherein this capacitor (C9) is connected with its negative connection to the ground line (A2).

At this point, the function of the current-limiting arrangement (STB), which is responsible for the starting function, is to be explained with respect to FIGS. 11 to 13.

Via the current-adjusting potentiometer (P3), the noninverting input of the current comparator (IC8a) is adjusted to a certain reference voltage ($U_{P3}$) which, during normal operation of the motor (2), is higher than the voltage ($U_{R19}$) at the inverting input, so that the current comparator (IC8a) does not switch through. The output of the current comparator (IC8a) is switched as an "open collector". This means that the potential at the collector of the output transistor of the comparator (IC8a)—in the non-switched-through state—is "free-floating," i.e., is determined by an external switching operation. In the switched-through state, ground potential is present at the collector. Therefore, in the present case, a floating potential appears at the output of the current comparator (IC8a), which is determined by the charging voltage ($U_{C9}$) of the condenser (C9). The level of the charging voltage ($U_{C9}$) depends on the resistance ratio of the voltage divider (R29/P2/R30) and thus on the respective adjustment of the speed-adjusting potentiometer (P2), i.e., the condenser (C9) is charged via (R30) and (P2) and is discharged—when the voltage of the motor (2) is turned off—via the resistances (R29) and (P2), since, as already mentioned above, the friction contact of the speed-adjusting potentiometer (P2) is connected with the central switching point (B). Subsequently, the condition ($U_{DZ}=U_{C9}$) is applicable.

When the operating current is switched on, an exponential charging of the capacitor (C9) takes place in accordance with FIG. 11, based on the voltage supply ($+U_B$) (12V) via the resistances (R30 and P2), via the capacitor (C9) to ground. The voltage ($U_{DZ}$ or $U_{C9}$) at the inverting input of the rpm comparator (IC8b) is thus at first smaller than the voltage ($U_{SZG}$) at its noninverting input, so that the output signal ($U_{K4}$=logical "1" is given (FIG. 12). This state is demonstrated in the time span between ($t_{10}$ and $t_{11}$). The charging voltage ($U_{C9}=U_{DZ}$) is smaller than the sawtooth voltage ($U_{SZG}$).

The output signal ($U_{K4}$) of the comparator (IC8b) can be seen in FIG. 12 and has the value of logical "1." In this manner, as previously described, driving of the transistors (T1 and T2) takes place (FIG. 4), so that the inputs (Y3 and Y4) of the switching connection (12) are grounded. This is demonstrated in FIG. 13, in which the signals at the inputs (Y3 and Y4) of the switching connection (12) are designated as ($U_{S6}$ or $U_{S7}$). At the instant ($t_{11}$), the charging voltage ($U_{C9}$) has attained such a value that a primary intersecting point with the sawtooth voltage ($U_{SZG}$) occurs. In this manner, a first timing pulse is created. Regarding this, reference is made in the above comments to FIGS. 9 and 10.

The motor (2) starts at the instant ($t_{11}$) during the first pulse, wherein due to the timed control signals (S3 and S4), a motor voltage ($U_M$) is present which, in principle, corresponds to the curve in accordance with FIG. 8h between the instant ($t_4$ and $t_7$). However, the pulse width during starting is not constant due to the exponential voltage increase at the capacitor, as can be seen from FIG. 13, between the instants ($t_{11}$) and ($t_{12}$).

If the voltage decline ($U_{R19}$) produced at the resistance (R19) becomes so great that the voltage ($U_{R19}$) present at the inverting input of the current comparator (IC8a) surpasses the reference voltage ($U_{P3}$) present at the noninverting input, then the output transistor of the current comparator (IC8a) becomes conductive and thus connects the output to ground. Thereby the inverting input of the rpm comparator (IC8b) is grounded and the capacitor (C9) is simultaneously discharged. This is the case in FIGS. 11 to 13 at the instant ($t_{12}$). Based on the ground potential at the inverting input of the rpm comparator (IC8b) and following the corresponding discharge of the capacitor (C9), a greater voltage is present at the inverting input of (IC8b) (instant $t_{13}$ in FIGS. 11 to 13). In this case, the rpm comparator (IC8b) gives off the output signal ($U_{K4}$)=logical "1." This leads to a switching-through of the transistors (T1 and T2) (FIG. 4), which thereby apply ground potential at the additional inputs (Y3 and Y4) of the switching circuit (12) (FIG. 13, instant $t_{13}$). This also produces a state wherein—as in the previously described case of speed regulation by means of the potentiometer (P2)—the control signals (S3) and (S4) switch to logical "0," which leads to the blockage of the output stage transistors (T5) and (T6) of the output stage of the motor.

Due to this turning-off of the motor current, the inverting input of the current comparator (IC8a) lies, with respect to ground, above the resistance (R19), which causes the output stage of the comparator (IC8a) to change to the blocking state, i.e., it causes its output to be free of ground. Since the connection point (B) in FIG. 3, between the speed-controlling potentiometer (P2) and the capacitor (C9) is no longer grounded, the charging of the capacitor (C9) can again take place. This instant is designated in FIG. 11 as ($t_{14}$).

Since the level of the admissible motor current can be adjusted by means of an appropriate adjustment of the current-adjusting potentiometer (P3) at the noninverting input of the current comparator (IC8a), its output, also prior to the complete discharge of the capacitor (C9), can render its output "ground-free," so that the charging process can then take place at instant ($t_{14a}$), as indicated in FIG. 11 by dotted lines.

This described process can be repeated several times at the noninverting input of the current comparator (IC8a)—depending on the setting of the current-adjusting potentiometer (P3) or of the reference voltage ($U_{P3}$)—until the starting current, which is elevated with respect to the normal rating of the motor, has fallen to its nominal value. The motor (2) then operates at the speed which is preset at the speed-adjusting potentiometer (P2) or via the external control voltage ($U_E$).

In an advantageous additional modification of the invention, the switching arrangement of the motor also receives an overtemperature shutoff device (50) (also see the block diagram in FIG. 2 which is expanded with respect to FIG. 1) for the protection of the motor (2) or the electronic components against overheating. This shutoff arrangement (50) is also defined in FIG. 3 by means of a dotted line. Also this overtemperature shutoff arrangement (50) operates, in accordance with the invention, via the central switching point (B) and effects the rpm comparator (IC8b), which in turn influences the starting of the output-stage transistors (T5 and T6) by means of its output signal ($U_{K4}$).

In accordance with FIG. 3, the overtemperature shutoff arrangement (50) has the voltage input (A3) and the ground input (A2), between which the positive direct current ($+U_B$) is present, which is produced by the voltage supply circuit (20) in accordance with FIG. 5. Between the voltage input (A3) and the ground (A2), a voltage divider is connected, which consists of a resistance (R40) and of an NTC resistor, series-connected thereto, wherein the NTC resistor represents a temperature sensor. A point (C) between the resistance (R40) and the NTC resistor of this voltage divider is, on the one hand, connected with the inverting input of a first "temperature comparator" (IC8c) via a resistance (R36) and, on the other hand, with the inverting input of a second "temperature comparator" (IC8d) via a resistance (R39). A voltage divider, consisting of three series-connected resistances (R32, R33, R34) is also connected between ($+U_B$) (connection A3) and ground (A2). The point between the first two resistances (R32 and R33) of this voltage divider is connected with the noninverting input of the first temperature comparator (IC8c). The point between the second and third resistance (R33 and R34) of the voltage divider is connected with the noninverting input of the second temperature comparator (IC8d). Thus, at the noninverting input of the first temperature comparator (IC8c), a reference voltage ($U_{ref3}$) of, for example, approximately 8.8 V is present and at the noninverting input of the second temperature comparator (IC8d), a reference voltage ($U_{ref4}$) of, for example, approximately 6.7 V is present. At each of the inverting inputs of the two temperature comparators (IC8c and IC8d), a voltage of, for example, a maximum of 10 V is present, wherein this voltage is dependent on the heating of the NTC resistor and on the resistance change connected therewith. The output of the first temperature comparator (IC8c) is connected with the base of a blocking transistor (T7), the emitter of which lies at ground (A2) and its collector at the inverting input of the second temperature comparator (IC8d). The output of the second temperature comparator (IC8d) is, on the one hand, connected with the base of the blocking transistor (T7) via a resistance (R37) and, on the other hand, with the base of a shutoff transistor (T8) via a resistance (R38). The emitter of this shutoff transistor (T8) lies at ground (A2) and the collector of the shutoff transistor (T8) is connected with the central switching point (B) of the motor switching arrangement of the invention and thus also with the inverting input of the rpm comparator (IC8b).

In the following text, the mode of operation of the overtemperature shutoff arrangement (50) of the invention will be explained. During normal operation of the motor (2) of the invention, the shutoff transistor (T8) is nonconductive, which means that its collector carries the voltage present at point (B). Thus, the overtemperature shutoff arrangement (50) has the advantage of not influencing the other switching process of the rpm comparator (IC8b). As already mentioned, at the noninverting input of the first temperature comparator (IC8c), the voltage ($U_{ref3}$) of approximately 8.8 V is present and at the noninverting input of the second temperature comparator (IC8d) the voltage ($U_{ref4}$) of approximately 6.7 V is present. For this purpose, the two temperature comparators (IC8c and IC8d) carry at their respective outputs the potential of logical "0." At the inverting inputs of both comparators, as already mentioned, a voltage ($U_{temp}$) of approximately 10 V is present. By means of the output signal of logical "0" at the first temperature comparator (IC8c), ground potential is present at the base of the blocking transistor (T7), so that the latter's activation is prevented.

If a warming or heating up of the motor (2) occurs, the resistance value of the NTC resistor decreases. This is connected with a drop in the voltage decline at the NTC resistor and thus also with a reduction in the voltage ($U_{temp}$) at the inverting inputs of the two temperature comparators (IC8c and IC8d). If at the inverting input of the first temperature comparator (IC8c) the reference voltage ($U_{ref3}$)—present at the noninverting input—falls short ($U_{temp} < U_{ref3}$), then this comparator changes its switching state, so that the connection to the ground or to the zero potential is interrupted ("open collector" circuit). Since the two temperature comparators lie at varying reference voltages ($U_{ref3}$ and $U_{ref4}$), no switchover of the second temperature comparator (IC8d) occurs at this point in time.

However, if the temperature increases even further, an additional decline of the voltage ($U_{temp}$) occurs at the two inverting comparator inputs. If, at this point, the switching threshold of the second temperature comparator (IC8d) also falls short ($U_{temp} < U_{ref4}$), then its output assumes logical "1" and thereby switches through the shutoff transistor (T8) via the base-series resistor (R38). This shutoff transistor grounds the switching point (B), i.e., the inverting input of the rpm comparator (IC8b). Thereby, the latter's output signal ($U_{K4}$), as already described above, becomes logical "1," whereby the transistors (T1 and T2) (FIG. 4) are switched through and logical "0" is applied to the inputs (Y3 and Y4) of the switching circuit (12). Thereby, the control signals (S3 and S4) become logical "0," as already described at another point, i.e., the motor current is interrupted and thus the motor is turned off.

Through the output signal of logical "1" of the second temperature comparator (IC8d), via the base resistance (R37), the blocking transistor (T7) is also advance-controlled, wherein the latter applies the inverting input of the second temperature comparator (IC8d) to ground potential (A2) via its collector-emitter line. In this way, it is achieved that a switchover of the second comparator (IC8d) based on negligible temperature drops is prevented. This practically represents a "look" of the second temperature comparator (IC8d) in its switched-through state.

If a cooling of the motor occurs, this is connected with an increase in the resistance value of the NTC resistor. This also results in a voltage increase at the inverting input of the first temperature comparator (IC8c). However, a voltage increase at the inverting input of the second temperature comparator (IC8d) is prevented since the latter's potential lies at ground potential due to the continued advance control of the blocking transistor (T7).

If the voltage ($U_{temp}$) has increased at the inverting input of the first (primary) temperature comparator (IC8c) due to the cooling of the motor and thus also of the NTC resistor to the reference voltage ($U_{ref3}$), the output of the first temperature comparator (IC8c) is again switched to logical "0." This results in ground potential being applied to the base of the blocking transistor (T7). The transistor (T7) thus changes to the blocking state, so that its collector potential can follow the voltage increase which has occurred at point C. Since this voltage ($U_{temp}$) is higher than the reference voltage ($U_{ref4}$) at the noninverting input of the second temperature comparator (IC8d), the latter switches its output to logical "0," which leads to the blocking of the shutoff transistor (T8), thus permitting the motor to startup.

The startup of the motor (2) takes place, in the manner already described, via the charging of the capacitor (C9).

Thus, the overtemperature shutoff arrangement (50) of the invention insures an automatic shutoff in the presence of an overtemperature, and preferably also an automatic restart of the motor after appropriate cooling.

It is also advantageous, if between the inverting input of the first temperature comparator (IC8c) and ground (A2) a capacitor (C10) is connected. With this capacitor (C10), the response time of the overtemperature shutoff arrangement (50) can be influenced, whereby this capacitor (C10) insures—through a smoothing of the voltage—that brief voltage peaks have no influence on the switching behavior of the first temperature comparator (IC8c). Thus, a certain overlap exists.

The invention is by no means limited to the illustrated and described example, but it comprises also all arrangements which operate in a similar manner to that of the invention.

We claim:

1. Method for driving an AC motor with speed control, comprising the steps of:
    pulse timing an AC motor voltage ($U_M$) into pulse-width modulatable voltage pulses with a constant clock pulse frequency lying outside the hearing range;
    controlling the motor speed by pulse-width modulation of said voltage pulses;
    obtaining the AC motor voltage ($U_M$) indirectly from a sinusoidal AC supply voltage ($U_N$) by rectifying said supply voltage ($U_N$) into a pulsating, unsmoothed DC voltage ($U_{A1}$) having sinusoidal half-waves; and
    controlling the polarity reversal of said DC voltage in accordance with the frequency of the AC supply voltage by means of two time overlap-free output signals ($U_{K1}$, $U_{K2}$) obtained from said AC supply voltage, so that said motor-voltage ($U_M$) is essentially composed of the sinusoidal half-waves of said pulsating DC-voltage ($U_{A1}$).

2. The method in accordance with claim 1 characterized by controlling the polarity reversal of the DC voltage ($U_{A1}$) from the AC supply voltage ($U_N$) by deriving a positive voltage signal ($U_{P1}$) which is cophasal with the AC supply voltage, and deriving a negative voltage signal ($U_{N2}$) which is also cophasal with the AC supply voltage ($U_N$), wherein each of these derived voltage signals ($U_{P1}$, $U_{N2}$) has sinusoidal half waves, comparing the derived voltage signals with a constant reference voltage ($U_{ref1}$ $U_{ref2}$) and, on the basis of this comparison, producing said two overlap-free output signals ($U_{K1}$, $U_{K2}$) separated by contact breaks.

3. The method in accordance with claim 2, characterized by producing four control signals (S1, S2, S3, S4) in response to the two overlap-free output signals ($U_{K1}$, $U_{K2}$) such that at all times only two control signals each (S2, S4 or S1, S3) lie at a logical "1" potential, while each of the other control signals (S1, S3, or S2, S4) lie at the logical "0" potential.

4. The method in accordance with claim 3, characterized in that the control signals (S1, S2, S3, S4) are directed to the gate electrodes (G) of an output stage (4), which are in an H-bridge circuit arrangement, wherein the motor (2) is connected to the shunt arm of the H-bridge circuit.

5. The method in accordance with claim 3 or 4, characterized in that for the speed adjustment of the motor, one (S3; S4) of the two control signals with the same potential (S1, S3 or S2, S4) is synchronized in a pulse-width modulatable manner.

6. The method in accordance with claim 5, characterized in that by comparing a sawtooth voltage ($U_{SZG}$) with an adjustable reference voltage ($U_{DZ}$), a timing output signal ($U_{K4}$) is produced which has a logical "0" potential when the reference voltage ($U_{DZ}$) is greater than the sawtooth voltage ($U_{SZG}$) and which has a logical "1" potential when the reference voltage ($U_{DZ}$) is smaller than the sawtooth voltage ($U_{SZG}$), and maintaining the control signals (S3 and S4) at the "0" potential through the two overlap-free output signals ($U_{K1}$, $U_{K2}$) when the timing output signal ($U_{K4}$) has a logical "1" potential.

7. The method in accordance with claim 6, characterized in that the reference voltage ($U_{DZ}$) is selectively adjustable so as to vary the operating speed of the motor.

8. The method in accordance with claim 6, characterized in that during the staring of the motor, the reference voltage ($U_{DZ}$) is automatically changed to follow the voltage charge of a capacitor ($U_{C9}$).

9. The method in accordance with claim 6, characterized in that when a predetermined disturbance variable occurs, a disturbance variable voltage signal with a logical "0" potential is produced, which then represents the reference voltage ($U_{DZ}$), so that the timing output signal ($U_{K4}$) has the logical "1" potential at all times in response to the disturbance variable voltage signal.

10. The method in accordance with claim 9, characterized by determining the motor current by measuring the voltage decline ($U_{R19}$) at a resistance connected to the motor and comparing this voltage decline ($U_{R19}$) with an adjustable current-reference voltage ($U_{P3}$), wherein the disturbance variable voltage signal is produced when the voltage decline ($U_{R19}$) is greater than said current-reference voltage ($U_{P3}$).

11. The method in accordance with claim 9, characterized in that the disturbance variable is temperature, the temperature is determined by measuring the voltage drop (Utemp) at a temperature-dropping resistor ($N_{TC}$), and this voltage drop is compared, on the one hand, with a higher temperature-reference voltage ($U_{ref3}$) and, on the other hand, with a lower temperature-reference voltage ($U_{ref4}$), wherein the disturbance variable voltage signal is produced when the voltage drop ($U_{temp}$) of the temperature-dropping resistor ($N_{TC}$) becomes smaller than the lower temperature reference voltage ($U_{ref4}$) through heating, and wherein the disturbance variable voltage signal is automatically cancelled when the voltage drop ($U_{temp}$) is again greater than the higher temperature reference voltage ($U_{ref3}$) following cooling.

12. A speed controller for a controllable alternating-current motor with at least one motor winding comprises a supply voltage bridge rectifier circuit, an output stage connected with the rectifier circuit and with electronic switching elements provided in the output stage, wherein the motor winding is connected to one bridge shunt arm of the output stage and with a driver arrangement which is connected with the output stage and which drives the electronic switching elements and with a pulse-width modulator, connected with the switching elements, characterized in that:

the rectifier circuit (6) has outputs (A1, A2) which are connected with inputs (E1, E2) of the output stage (4) so that said rectifier circuit rectifies AC supply voltage and produces an unsmoothed, pulsating Dc voltage ($U_{A1}$) with sinusoidal half waves is present at the inputs (E1, E2), the driver arrangement (10, 12) drives the electronic switching elements (T3 to T6) in accordance with the frequency of the ac supply voltage in such a way that at the outputs (M1, M2) of the output stage (4), connected with the motor winding (2), a motor AC voltage ($U_M$) is present which is composed of the sinusoidal half waves of the pulsating direct current voltage ($U_{A1}$), and wherein a control electrode (G) of one switching element in each (T5; T6) of the switching elements, which are driven in paris, indirectly connected with the pulse-width modulator (16), which synchronizes at a constant, pulse-width modulatable timing frequency, so as to provide selective speed control of the motor.

13. A speed controller in accordance with claim 12, characterized in that the timing frequency of the pulse-width modulator (16) is $\geq 20$ k$_{Hz}$.

14. A speed controller in accordance with claim 12 or 13, characterized in that the driver arrangement has a driver circuit (10) with a first comparator (IC3a) and a second comparator EC3b), means providing a positive reference voltage ($U_{ref1}$) at the inverting input of the first comparator (IC3a), means providing a positive voltage ($U_{P1}$) at the noninverting input of the second comparator, the positive voltage ($U_{P1}$) being derived from and cophasal with the AC supply voltage ($U_N$) having sinusoidal half waves, and means providing a negative reference voltage ($U_{ref2}$) at the noninverting input of the second comparator (IC3b), means providing at the inverting input of the second comparator a voltage ($U_{N2}$) which is derived from the AC supply voltage ($U_N$) and which is in phase with the AC supply voltage and is negative, consisting of sinusoidal half waves, wherein the amount of the reference voltages ($U_{ref1}$, $U_{ref2}$) is in each case substantially smaller than the amount of the peak value of the respectively derived voltage ($U_{P1}$, $U_{N2}$).

15. A speed controller in accordance with claim 14, characterized in that the driver arrangement has a connection circuit (12) with two inputs (Y1, Y2), each of which is connected with an output of one of the two comparators (IC3a, IC3b) of the driver circuit (10) via a line (K1, K2), wherein the connection circuit (12) has four outputs (Z1 to Z4) for control signals (S1 to S4), which are connected with the control electrodes (G) of the electronic switching elements (T3 to T6) of the output stage (4).

16. A speed controller in accordance with claim 15, characterized in that in at least two outputs (Z1, Z2) of the connection circuit (12), there is one driver stage (TR) for electrical isolation between the connection circuit (12) and the output stage (4).

17. A speed controller in accordance with claim 15, characterized in that the connection circuit (12) has two additional inputs (Y3, Y4), which influence at least two of the outputs (Z3, Z4) in such a way, that with a logical "0" potential at the additional inputs (Y3, Y4), the control signals (S3, S4) at these outputs (Z3, Z4) are always equal to logical "0".

18. A speed controller in accordance with claim 17, characterized in that the additional inputs (Y3, Y4) of the connection circuit (12) are each connected with ground (A2) via the collector/emitter lines of two transistors (T1, T2), wherein the bases of the two transistors (T1, T2) are connected with a common driver line (S5).

19. A speed controller in accordance with claim 18, characterized in that the common driver line (S5) is connected with the output of a rpm comparator (IC8b), forming the pulse-width modulator (16), wherein the noninverting input of the rpm comparator is connected with an output of a sawtooth generator (32) and its inverting input is connected with a central switching point (B).

20. A speed controller in accordance with claim 19, characterized in that the central switching point (B) is connected with a friction contact of a speed-adjusting potentiometer (P2).

21. A speed controller in accordance with claim 19, characterized in that the central switching point (B) is linked with a connection for an external control voltage ($U_E$).

22. A speed controller in accordance with claim 19, characterized in that the central switching point (B) is connected with a capacitor (C9) operative to produce a rising voltage for controlling a gradual starting arrangement (44) of the motor.

23. A speed controller in accordance with claim 19, characterized in that the central switching point (B) is connected with the output of a current comparator (IC8a), forming a current-limiting arrangement (STB), at the inverting input of which a voltage (Ur19) is present, which is tapped at a resistance (R19) arranged in the motor current circuit and proportional to the motor current, and at the noninverting input of which a current-reference voltage ($U_{P3}$) is present which is selectively adjustable via a current-adjusting potentiometer (P3).

24. A speed controller in accordance with claim 19, characterized in that the central switching point (B) is connected with the output of an overtemperature shutoff arrangement (50).

25. A speed controller in accordance with claim 24, characterized in that the overtemperature shutoff arrangement (50) has a first temperature comparator (IC8c) and a second temperature comparator (IC8d), wherein at each of the inverting inputs of these comparators, a voltage ($U_{temp}$) is present which drops at a temperature-dropping resistor (NTC) and wherein, at the noninverting input of the first temperature comparator (IC8c), a first reference voltage ($U_{ref3}$) is present and at the noninverting input of the second temperature comparator (IC8d), a second reference voltage ($U_{ref4}$) is present, whereby the first reference voltage ($U_{ref3}$) is greater than the second reference voltage ($U_{ref4}$) and, during normal operation of the motor, the voltage ($U_{temp}$) at the temperature-dropping resistor (NTC) is greater than the first reference voltage ($U_{ref3}$).

26. A speed controller in accordance with claim 25, characterized in that the inverting input of the second temperature comparator (IC8d) is connected with ground (A2) via the collector/emitter line of a blocking transistor (T7), wherein the base of the blocking transistor (T7) is connected, on the one hand, with the output of the first temperature comparator (IC8c) and, on the other hand, with the output of the second temperature comparator (IC8d).

27. A speed controller in accordance with claim 25 characterized in that the output of the second temperature comparator (IC8d) is connected with the base of a shutoff transistor (T8), the collector/emitter line of which lies between the ground (A2) and the output of the overtemperature shutoff arrangement (50), this output being connected with the central switching point (B).

* * * * *

UNITED STATES PATENT AND TRADEMARK OFFICE
CERTIFICATE OF CORRECTION

PATENT NO.  : 5,021,726

DATED       : June 4, 1991

INVENTOR(S) : Wilhelm Reinhardt et al.

It is certified that error appears in the above-identified patent and that said Letters Patent is hereby corrected as shown below:

Column 15, line 44, change "staring" to --starting--.

Column 16, line 36, change "paris" to --pairs--.

Column 16, line 43, change "$\leq$" to --$\geq$--.

Column 16, line 52, after "($U_N$)" insert --and--.

Signed and Sealed this

Twentieth Day of October, 1992

Attest:

DOUGLAS B. COMER

*Attesting Officer*      Acting Commissioner of Patents and Trademarks